United States Patent [19]
Löhr et al.

[11] 3,800,778
[45] Apr. 2, 1974

[54] DEVICE FOR STEAMING FOODS

[75] Inventors: Alfred Löhr, Bochum; Wolfgang Schwan, Gelsenkirchen-Buer; Wolfgang Tscheck, Westerholt, all of Germany

[73] Assignee: F. Kuppersbusch & Sohne Aktiengesellschaft, Gelsenkirchen, Germany

[22] Filed: Apr. 3, 1972

[21] Appl. No.: 240,640

[30] Foreign Application Priority Data
Apr. 2, 1971   Germany............................ 2116140

[52] U.S. Cl..................... 126/369, 99/468, 126/374
[51] Int. Cl. ............................................. A47j 27/04
[58] Field of Search ...... 126/348, 369, 374; 99/468, 99/472

[56] References Cited
UNITED STATES PATENTS

| | | | |
|---|---|---|---|
| 2,495,603 | 1/1950 | Ryan.............................. | 126/374 X |
| 3,166,332 | 1/1965 | Olson............................. | 220/46 R X |
| 2,632,579 | 3/1953 | Bakst et al. .................... | 220/46 R X |
| 2,593,770 | 4/1952 | Kollsman ........................ | 220/55.3 |
| 2,422,974 | 6/1947 | Newell............................ | 126/374 X |
| 2,708,636 | 5/1955 | Rivoche.......................... | 99/DIG. 5 |

FOREIGN PATENTS OR APPLICATIONS

| | | | |
|---|---|---|---|
| 1,071,306 | 12/1959 | Germany ........................ | 126/374 |
| 23,767 | 11/1918 | Denmark ........................ | 126/374 |

*Primary Examiner*—William F. O'Dea
*Assistant Examiner*—W. C. Anderson
*Attorney, Agent, or Firm*—Spencer & Kaye

[57]   ABSTRACT

Steam, generated in a steam cooker for foods, is controlled, with respect to the temperature of the steam, over both a range of steam pressure valves in excess of atmospheric pressure and a range of subatmospheric pressure valves.

3 Claims, 2 Drawing Figures

PATENTED APR 2 1974 3,800,778

DEVICE FOR STEAMING FOODS

BACKGROUND OF THE INVENTION

The present invention relates to a device for steaming foods in which a vessel for holding the food serves as a pressure vessel and this vessel is closed with a pressure-tight seal by means of a cover having a sealing ring.

Steam cookers are presently known and are generally constituted by pressure vessels which hold the food to be cooked. These pressure vessels can be closed by means of a lockable cover to provide a pressure-tight seal.

A heating device is associated with the pressure vessel to produce the steam either from water put into the pressure vessel or from the water contained in the food to be cooked. In previously known steam cookers the food is cooked by steam at a pressure in excess of atmospheric pressure. By using this method delicate foods are often overcooked so that many of the vitamins in these foods are lost. Moreover overcooked foods are substantially harder to digest.

SUMMARY OF THE INVENTION

Therefore, it is an object of the present invention to provide a steam cooker which can be used over a wider range of steam pressures and in which it is possible to carefully cook delicate foods.

This is accomplished, according to the present invention, in that the steam cooker is so designed that the pressure vessel can be used selectively either to cook the food with steam at a pressure in excess of atmospheric pressure or with steam at subatmospheric pressure.

There are certain advantages to using a device according to the present invention and an important advantage is that in such a device it is possible to steam delicate foods at a temperature below 100°C so that health or diet foods can be more carefully prepared.

DESCRIPTION OF THE PREFERRED EMBODIMENTS

Figure 1:
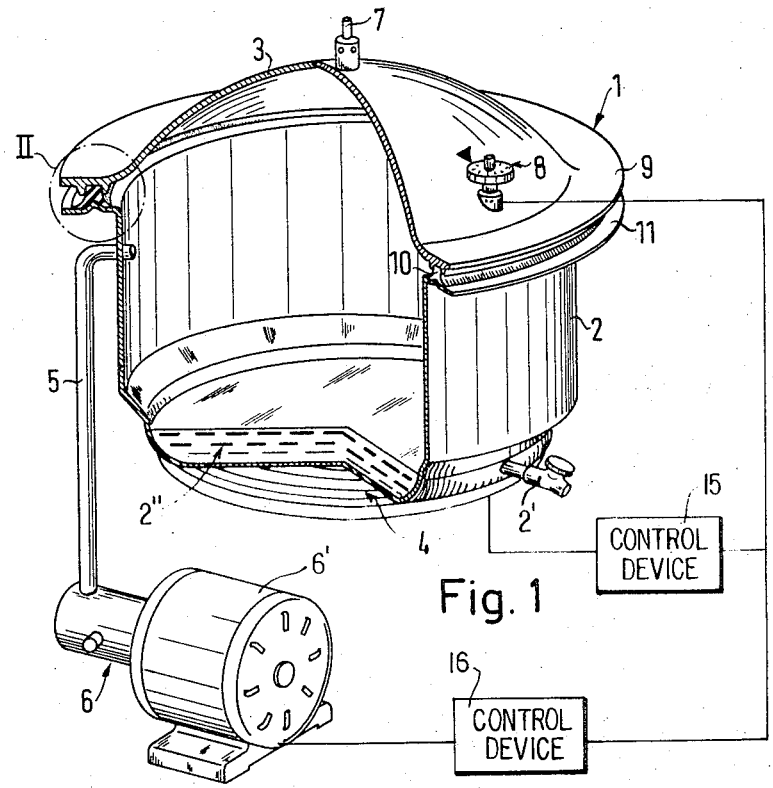
FIG. 1 is a partly cut-away perspective view of a steam cooker according to the present invention.

FIG. 1 shows a steam cooker 1 according to the invention for cooking foods and including a pressure vessel 2 for holding food with a cover 3 which can be attached to the pressure vessel, in sealing engagement therewith, by suitable locking devices, not shown.

A heating device 4 is disposed at the bottom of the heating vessel 2. This pressure device can be any one of a number of well-known devices, such as an electric resistance heater, and therefore need not be described in detail.

Near the bottom of the pressure vessel 2 there is an inlet valve 2' through which water, indicated generally at 2'', can be admitted to the interior of the pressure vessel 2.

A vacuum pump, shown generally at 6, which can be of known construction, is driven by suitable means, such as the electric motor 6'. This pump is connected to the interior of the pressure vessel 2 by a line 5 that extends through the upright wall of the vessel 2.

Cover 3 has a conventional safety valve 7 and a regulator device 8, which can be a pressure regulator or a thermoswitch of known design. In this embodiment, device 8 is operatively connected, as seen in schematic form in FIG. 1, to conventional pressure or temperature responsive control devices 15 and 16, for controlling the operation of the heating device 4 and electric motor 6', respectively.

Figure 2:
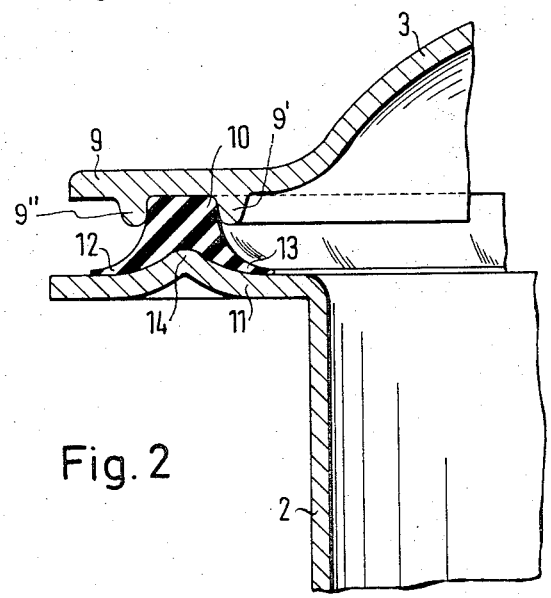
FIG. 2 is an enlarged cross-sectional detail view of the portion of FIG. 1 enclosed by dot-dash circle II.

Attached at the peripheral edge portion 9 of cover 3 is a sealing ring 10 that can be of suitable material, such as rubber, to provide a hermetic seal between the cover and the vessel. As seen most clearly in FIG. 2, sealing ring 10 is held to cover 3 between concentric annular ridges 9' and 9''. On the sealing ring itself there are two oppositely disposed lips 12 and 13, which, when the cover 3 is placed in operative position on top of pressure vessel 2, cooperate with an annular collar 14 on the edge portion 11 of the pressure vessel.

It will be appreciated that, with the double lip arrangement on the sealing ring 10, lip 13 is an effective seal when steam pressure in the pressure vessel 2 is above atmospheric pressure. On the other hand if the pressure in this pressure vessel is subatmospheric then lip 12 provides a seal. This latter condition is achieved when vacuum pump 6 is operated.

The valves of the steam temperature and internal pressure in pressure vessel 2 of the steam cooker 1 are interrelated, i.e., mutually dependent. To achieve the best result, these two parameters must be adapted to the food to be cooked. This can be effected either by control of the pressure, control of the water temperature, or simultaneously control of pressure and water temperature. In pressure vessel 2 of steam cooker 1 the evaporation of water can produce a selectable steaming temperature in the range of 100°–120°C when the vacuum pump 6 is not switched on, while with the vacuum pump 6 operating, the steaming temperature can be regulated and set in the range between about 60°–100°C, a lower temperature corresponding to a lower pressure.

If food is to be cooked by steam at subatmospheric pressure, the steam cooker is put into operation by adding water to the pressure vessel 2, then locking the cover 3, pumping the pressure vessel 2 out with vacuum pump 6 so that a subatmospheric pressure is produced therein and switching on the heating device 4. With the appropriate automatic control of the vacuum pump 6, or the selected temperature of the water, the steam pressure in pressure vessel 2 can be automatically controlled so that genuine steaming of the food within a temperature range of 60°–100°C is accomplished.

If it is desired to steam the food in a temperature range of 100°–120°C, the vacuum pump 6 is not used and the water temperature is controlled through regulator device 8 and control device 15 acting on heating device 4.

It will be understood that the above description of the present invention is susceptible to various modifications, changes and adaptations, and the same are intended to be comprehended within the meaning and range of equivalents of the appended claims.

We claim:

1. In a steam cooker for cooking foods, the cooker being composed of a pressure vessel for holding the food and including a cover with a sealing ring for closing the vessel in a pressure-tight manner, and a heating device associated with the pressure vessel to convert water in the pressure vessel into steam, the improvement comprising: means operatively associated with said vessel and said heating device for selectively controlling the temperature of the steam in the interior of said vessel over a range corresponding to steam pressure values in the pressure vessel which vary from above atmospheric to subatmospheric, said means including a vacuum pump which is operatively connected to the interior of said vessel; and said sealing ring having two oppositely disposed sealing lips, one of said sealing lips being directed toward the interior of said vessel and the other of said sealing lips being directed toward the exterior of said vessel when said vessel is closed by said cover.

2. An arrangement as defined in claim 1, wherein said means further comprises: a regulator device disposed for monitoring the steam in said vessel and for producing a signal indicative of the temperature or pressure of the steam; and control devices associated with said heating device and said vacuum pump, said control devices being operatively connected to said regulator device so that said control devices act to control the operation of at least one of said heating devices and said vacuum pump in response to signals from said regulator device, whereby the selectable temperature of the steam is controlled by regulating at least one of the pressure in the pressure vessel and the temperature of the water.

3. An arrangement as defined in claim 1 wherein said vessel has an annular rim arranged to engage said cover and said rim has an annular beaded section facing said cover; said sealing ring engages said annular beaded section with one of said lips resting on one side of said beaded section and the other of said lips resting on the other side of said beaded section.

* * * * *